United States Patent
Meirzon et al.

(10) Patent No.: US 6,934,512 B2
(45) Date of Patent: *Aug. 23, 2005

(54) SWITCHING VSAT TRANSMITTER

(75) Inventors: Tal Meirzon, Raanana (IL); Ido Nordenberg, Tel Aviv (IL)

(73) Assignee: Gilat Satellite Networks, Ltd., Petah Tikvah (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 16 days.

(21) Appl. No.: 09/185,070

(22) Filed: Nov. 3, 1998

(65) Prior Publication Data

US 2003/0100260 A1 May 29, 2003

(51) Int. Cl.7 .................................. H04B 7/185
(52) U.S. Cl. .............. 455/12.1; 455/13.1; 455/427
(58) Field of Search ................. 455/127, 12.1, 455/13.1, 13.3, 522, 13.2, 427, 341, 127.1–127.4, 343.2, 343.1, 343.5; 485/127.1–127.4, 343.2, 343.1, 343.5

(56) References Cited

U.S. PATENT DOCUMENTS

| | | | |
|---|---|---|---|
| 4,704,735 A | * 11/1987 | Swapp et al. ............ 455/127.3 |
| 5,128,938 A | 7/1992 | Borras | |
| 5,233,645 A | 8/1993 | Choi et al. | |
| 5,481,561 A | * 1/1996 | Fang ........................ 375/205 |
| 5,594,951 A | 1/1997 | Bellin | |
| 5,640,691 A | * 6/1997 | Davis et al. ................ 455/126 |
| 5,678,228 A | * 10/1997 | Soleimani et al. .......... 455/343 |
| 5,768,684 A | * 6/1998 | Grubb et al. .............. 455/13.4 |
| 5,809,420 A | * 9/1998 | Ichiyanagi et al. ...... 455/127.2 |
| 5,826,170 A | * 10/1998 | Hirschfield et al. ........ 455/13.4 |
| 5,991,635 A | * 11/1999 | Dent et al. .................. 455/517 |
| 6,064,857 A | * 5/2000 | Wiedeman et al. ....... 455/127.4 |
| 6,311,048 B1 | * 10/2001 | Loke ....................... 455/343.2 |
| 6,556,807 B1 | * 4/2003 | Horie et al. ............... 455/3.02 |

FOREIGN PATENT DOCUMENTS

EP        0426452 A2     5/1991

OTHER PUBLICATIONS

Khan K.S> "A single hop data/voice VSAT", Andrew Corporation, Richardson, TX 75081, 1990, pp. 23.6.1–23.6.4

* cited by examiner

Primary Examiner—Edward F. Urban
Assistant Examiner—Lana Le
(74) Attorney, Agent, or Firm—Banner & Witcoff Ltd.

(57) ABSTRACT

A VSAT terminal including an antenna, a microwave power amplifier, a microwave low noise amplifier, a transmitter coupled via the microwave power amplifier to the antenna, a receiver coupled via the microwave low noise amplifier to the antenna, a user VSAT interface, and a controller in communication with the user VSAT interface and in electrical connection with the microwave power amplifier and the microwave low noise amplifier for supplying power thereto, the controller being operative to provide a less-than-full electrical power supply to either of the amplifiers in the absence of a communication session and operative to provide a full electrical power supply to either of the amplifiers in the presence of a communication session.

15 Claims, 4 Drawing Sheets

SWITCHING VSAT TRANSMITTER

FIELD OF THE INVENTION

The present invention relates to telecommunication in general, and in particular to improved VSAT satellite telecommunications methods and apparatus.

BACKGROUND OF THE INVENTION

Primary design considerations for a VSAT satellite telecommunication network include the cost of the remote terminal (VSAT) as a function of its complexity, power consumption, and dish size, the bandwidth efficiency as determined by the access scheme, and the cost of the network switch or "hub." The type and availability of a power source may have a significant impact on the cost of a VSAT, particularly in rural or remote regions where power supply is relatively scarce and expensive.

SUMMARY OF THE INVENTION

The present invention seeks to provide improved VSAT satellite telecommunications methods and apparatus having reduced overall power consumption. A typical low cost VSAT terminal comprises simple power and low noise amplifiers. These amplifiers are the major power consuming elements, and often account for more than 50% of total VSAT power consumption. Power switching methods and apparatus is provided for use with such simple, low cost amplifiers that are not generally equipped with controllers.

There is thus provided in accordance with a preferred embodiment of the present invention a VSAT terminal including an antenna, a microwave power amplifier, a microwave low noise amplifier, a transmitter coupled via the microwave power amplifier to the antenna, a receiver coupled via the microwave low noise amplifier to the antenna, a user VSAT interface, and a controller in communication with the user VSAT interface and in electrical connection with the microwave power amplifier and the microwave low noise amplifier for supplying power thereto, the controller being operative to provide a less-than-full electrical power supply to either of the amplifiers in the absence of a communication session and operative to provide a full electrical power supply to either of the amplifiers in the presence of a communication session.

Further in accordance with a preferred embodiment of the present invention the controller is responsive to operation of the user VSAT interface for providing electrical power to the microwave power amplifier.

Still further in accordance with a preferred embodiment of the present invention the controller is responsive to operation of the user VSAT interface for providing electrical power to the microwave low noise amplifier.

Additionally in accordance with a preferred embodiment of the present invention the controller provides a less-than-full power supply to the microwave low noise amplifier and the microwave power amplifier in the absence of a communication session and the controller is responsive to operation of the user VSAT interface for providing a full electrical power supply to the microwave low noise amplifier and the microwave power amplifier.

Moreover in accordance with a preferred embodiment of the present invention the controller provides a less-than-full power supply to the microwave power amplifier and a full power supply to the microwave low noise amplifier in the absence of a communication session and the controller is responsive to operation of the user VSAT interface for providing a full electrical power supply to the microwave low noise amplifier and the microwave power amplifier.

Further in accordance with a preferred embodiment of the present invention the controller provides a less-than-full power supply to the microwave power amplifier and a full power supply to the microwave low noise amplifier in the absence of a communication session and the controller is responsive to receipt of an incoming transmission via the microwave low noise amplifier for providing a full electrical power supply to the microwave low noise amplifier and the microwave power amplifier.

Still further in accordance with a preferred embodiment of the present invention the controller is operative to provide a less-than-full electrical power supply to either of the amplifiers after a predetermined period of inactivity of the user VSAT interface.

Additionally in accordance with a preferred embodiment of the present invention the controller is operative to provide a less-than-full electrical power supply to either of the amplifiers after a predetermined period of inactivity of the microwave low noise amplifier.

Moreover in accordance with a preferred embodiment of the present invention the controller operates in accordance with a predetermined algorithm for providing electrical power to the microwave power amplifier.

There is also provided in accordance with a preferred embodiment of the present invention a VSAT telecommunication network including at lease one satellite, and a plurality of VSAT terminals in communication with the satellite, the at least one of the VSAT terminals includes an antenna, a microwave power amplifier, a microwave low noise amplifier, a transmitter coupled via the microwave power amplifier to the antenna, a receiver coupled via the microwave low noise amplifier to the antenna, a user VSAT interface, and a controller in communication with the user VSAT interface and in electrical connection with the microwave power amplifier and the microwave low noise amplifier for supplying power thereto, the controller being operative to provide a less-than-full electrical power supply to either of the amplifiers in the absence of a communication session and operative to provide a full electrical power supply to either of the amplifiers in the presence of a communication session.

There is additionally provided in accordance with a preferred embodiment of the present invention a method for managing power consumption in a VSAT terminal having an antenna, a microwave power amplifier, a microwave low noise amplifier, a transmitter coupled via the microwave power amplifier to the antenna, a receiver coupled via the microwave low noise amplifier to the antenna, a user VSAT interface, and a controller in communication with the user VSAT interface, the microwave low noise amplifier, and the microwave power amplifier, the method including providing a less-than-full electrical power supply to either of the amplifiers in the absence of a communication session, and providing a full electrical power supply to either of the amplifiers in the presence of a communication session.

Further in accordance with a preferred embodiment of the present invention the providing a less-than-full electrical power supply step includes providing a less-than-full power supply to the microwave low noise amplifier and the microwave power amplifier in the absence of a communication session and the providing a full electrical power supply step includes providing a full electrical power supply to the microwave low noise amplifier and the microwave power amplifier in response to operation of the user VSAT interface.

Still further in accordance with a preferred embodiment of the present invention the method further includes providing a full power supply to the micro-wave power amplifier in the absence of a communication session, the providing a less-than-full electrical power supply step includes providing a less-than-full power supply to the microwave power amplifier and the providing a full electrical power supply step includes providing a full electrical power supply to the microwave power amplifier and the microwave power amplifier in response to operation of the user VSAT interface.

Additionally in accordance with a preferred embodiment of the present invention the method further includes providing a full power supply to the microwave power amplifier in the absence of a communication session, the providing a less-than-full electrical power supply step includes providing a less-than-full power supply to the microwave power amplifier and the providing a full electrical power supply step includes providing a full electrical power supply to the microwave low noise amplifier and the microwave power amplifier in response to receipt of an incoming transmission via the microwave low noise amplifier.

Moreover in accordance with a preferred embodiment of the present invention the providing a less-than-full electrical power supply step includes providing a less-than-full power supply to either of the amplifiers after a predetermined period of inactivity of the user VSAT interface.

Further in accordance with a preferred embodiment of the present invention the providing a less-than-full electrical power supply step includes providing a less-than-full power supply to either of the amplifiers after a predetermined period of inactivity of the microwave low noise amplifier.

BRIEF DESCRIPTION OF THE DRAWINGS

The present invention will be understood and appreciated from the following detailed description, taken in conjunction with the drawings in which.

DETAILED DESCRIPTION OF PREFERRED EMBODIMENTS

Figure 1:
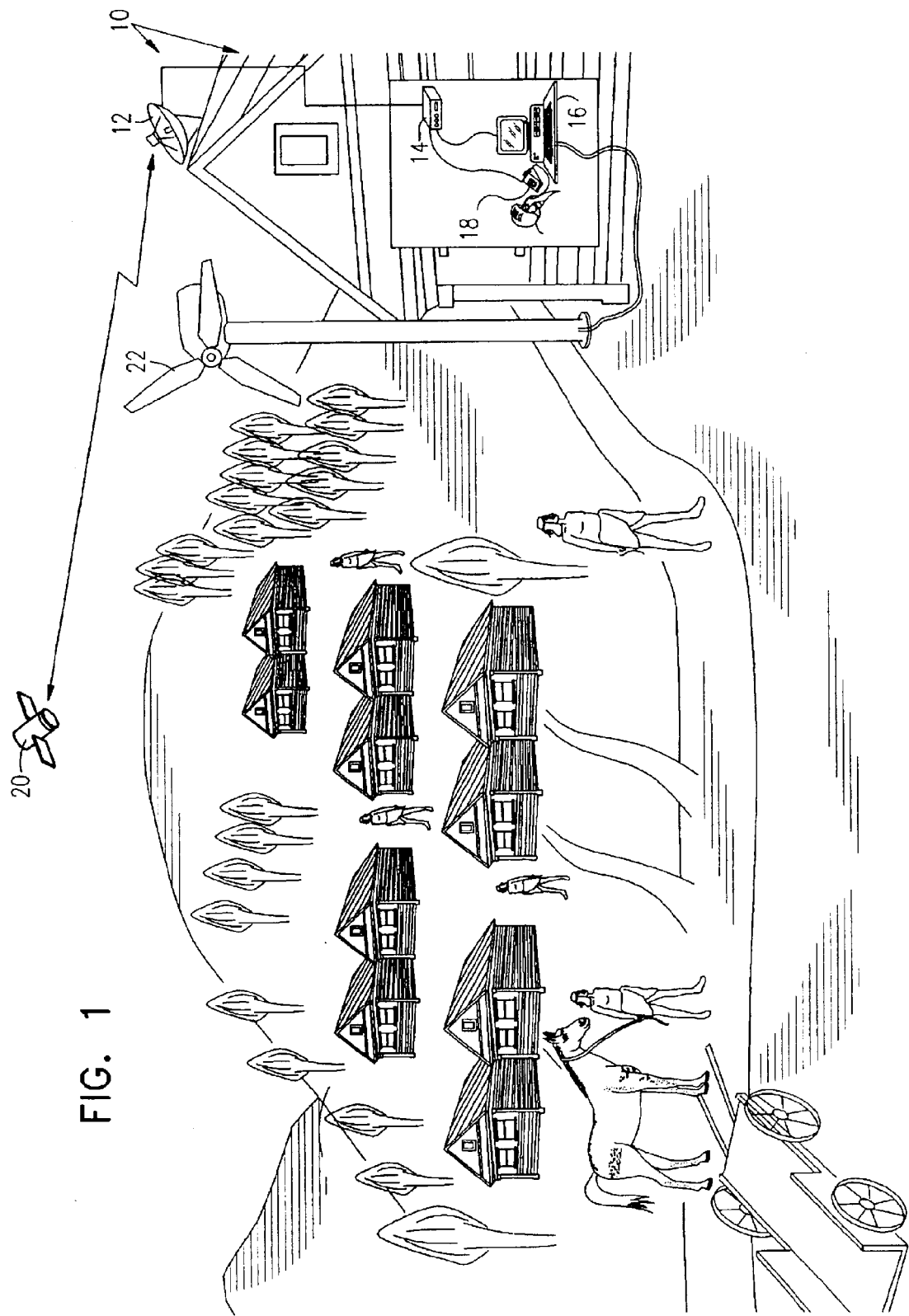
FIG. 1 is a simplified pictorial illustration of a VSAT satellite telecommunication network system constructed and operative in accordance with a preferred embodiment of the present invention.

Reference is now made to FIG. 1 which is a simplified pictorial illustration of a VSAT satellite telecommunication network system constructed and operative in accordance with a preferred embodiment of the present invention. In the system of FIG. 1 one or more VSATs 10, typically including an antenna 12 connected to a control unit 14, also referred to as an "indoor unit" or IDU, are provided, for communication with a satellite 20. VSAT 10 is typically connected to one or more user interfaces such as a computer 16 and a voice communicator 18. A power source 22 is provided to power VSAT 10. In rural or remote areas, such as the mountainous region shown in FIG. 1, any power source 22 may be an alternative power source such as a windmill or solar panels, although any known power source may be provided.

Figure 2:
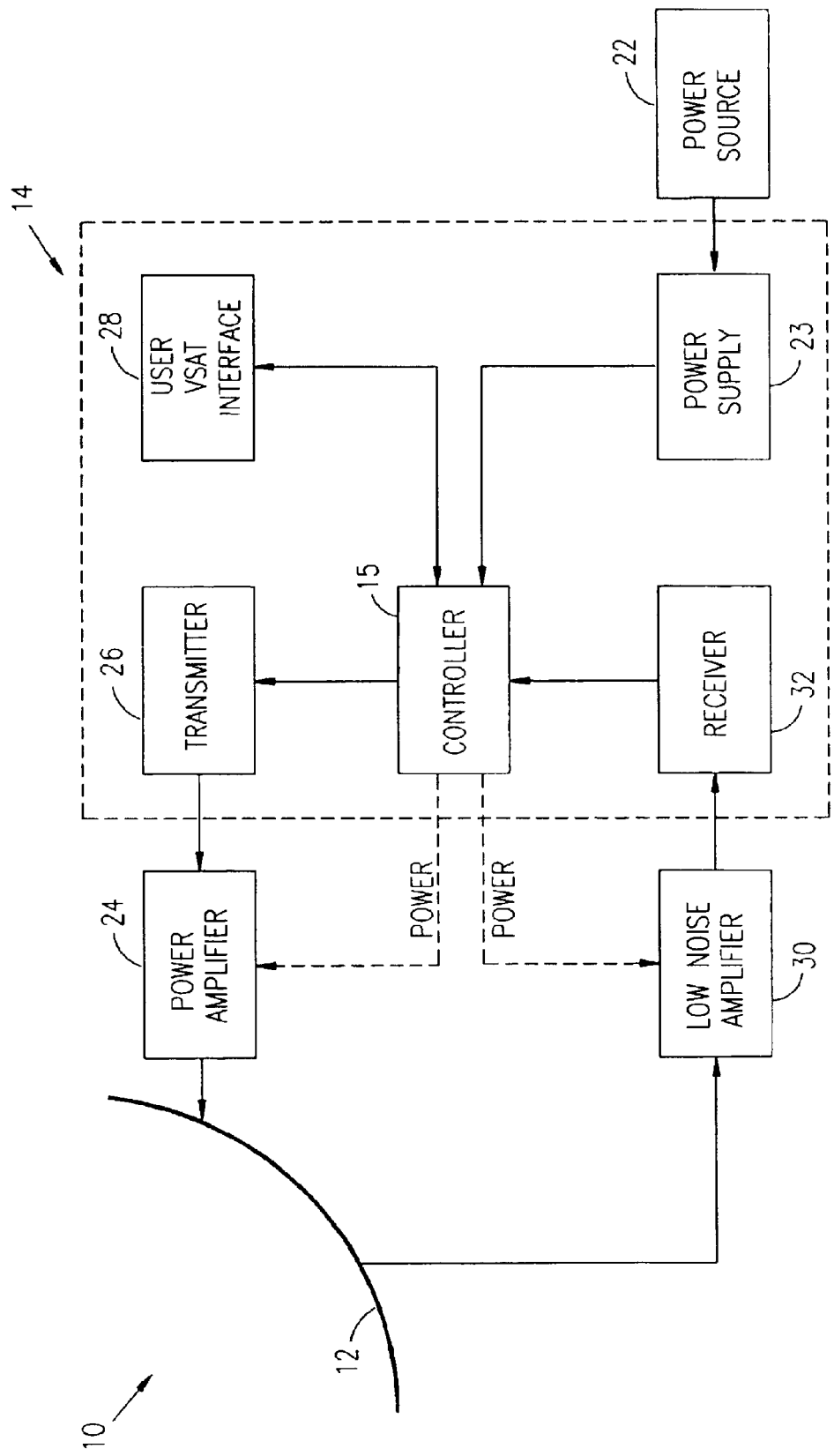
FIG. 2 is a simplified block diagram of the VSAT terminal of FIG. 1.

Reference is now made to FIG. 2 which is a simplified block diagram of the VSAT terminal 10 of FIG. 1. Terminal 10 typically comprises a power amplifier 24 connected to antenna 12, such as any known microwave power amplifier, a transmitter 26, and a user VSAT interface 28, typically connectable to computer 16 and voice communicator 18. Terminal 10 also typically comprises a low noise amplifier 30 connected to antenna 12, such as any known microwave low noise amplifier, and a receiver 32. A controller 15, typically being connected to power source 22 via a power supply 23, directs full power or less-than-full power to power amplifier 24 and/or low noise amplifier 30 as described hereinbelow. Transmitter 26, user VSAT interface 28, receiver 32, controller 15, and power supply 23 typically collectively form control unit 14.

Figure 3:
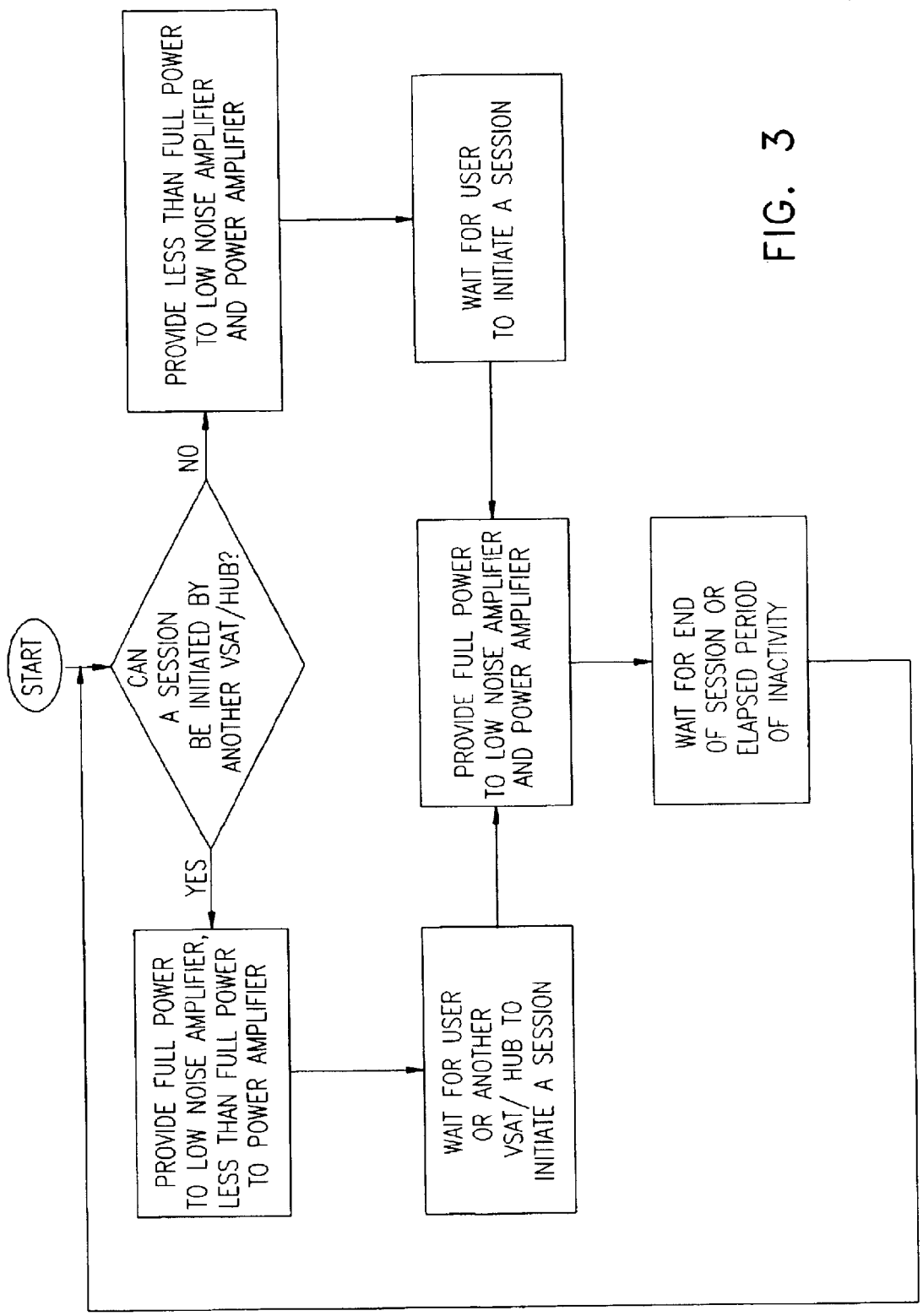
FIG. 3 is a simplified flow chart of a method of using VSAT 10 operative in accordance with a preferred embodiment of the present invention.

Typical operation of VSAT 10 of FIG. 2 is now described with additional reference to FIG. 3 which is a simplified flow chart of a method of using VSAT 10 operative in accordance with a preferred embodiment of the present invention. The method of FIG. 3 provides for two preferred modes of operation of VSAT 10. In one mode of operation a communication session may be initiated by either a user via user VSAT interface 28 or by another VSAT or hub wishing to communicate with VSAT 10. In this mode controller 14 provides full power to low noise amplifier 30 and less-than-full power to power amplifier 24. Less-than-full power may be any power level less than that which is required for normal operation of low noise amplifier 30 and power amplifier 24, including no power at all. Controller 14 then waits until an incoming transmission is received by VSAT 10 or until a user initiates an outgoing transmission. Controller 14 then continues to provide full power low noise amplifier 30, as well as to power amplifier 24.

In another mode of operation a communication session may only be initiated by a user via user VSAT interface 28. In this mode controller 14 provides less-than-full power to low noise amplifier 30 and power amplifier 24. Controller 14 then waits until the user initiates an outgoing transmission. Controller 14 then provides full power to both low noise amplifier 30 and power amplifier 24.

Whichever operational mode is used, once a session has either been expressly ended or a predetermined period of inactivity has elapsed, low noise amplifier 30 and power amplifier 24 preferably revert to their pre-session power modes as indicated above.

It is appreciated that the method of FIG. 3 may be partly or wholly implemented as a computer software algorithm, as preprogrammed computer hardware, or as any suitable combination using techniques well known in the art.

Figure 4:
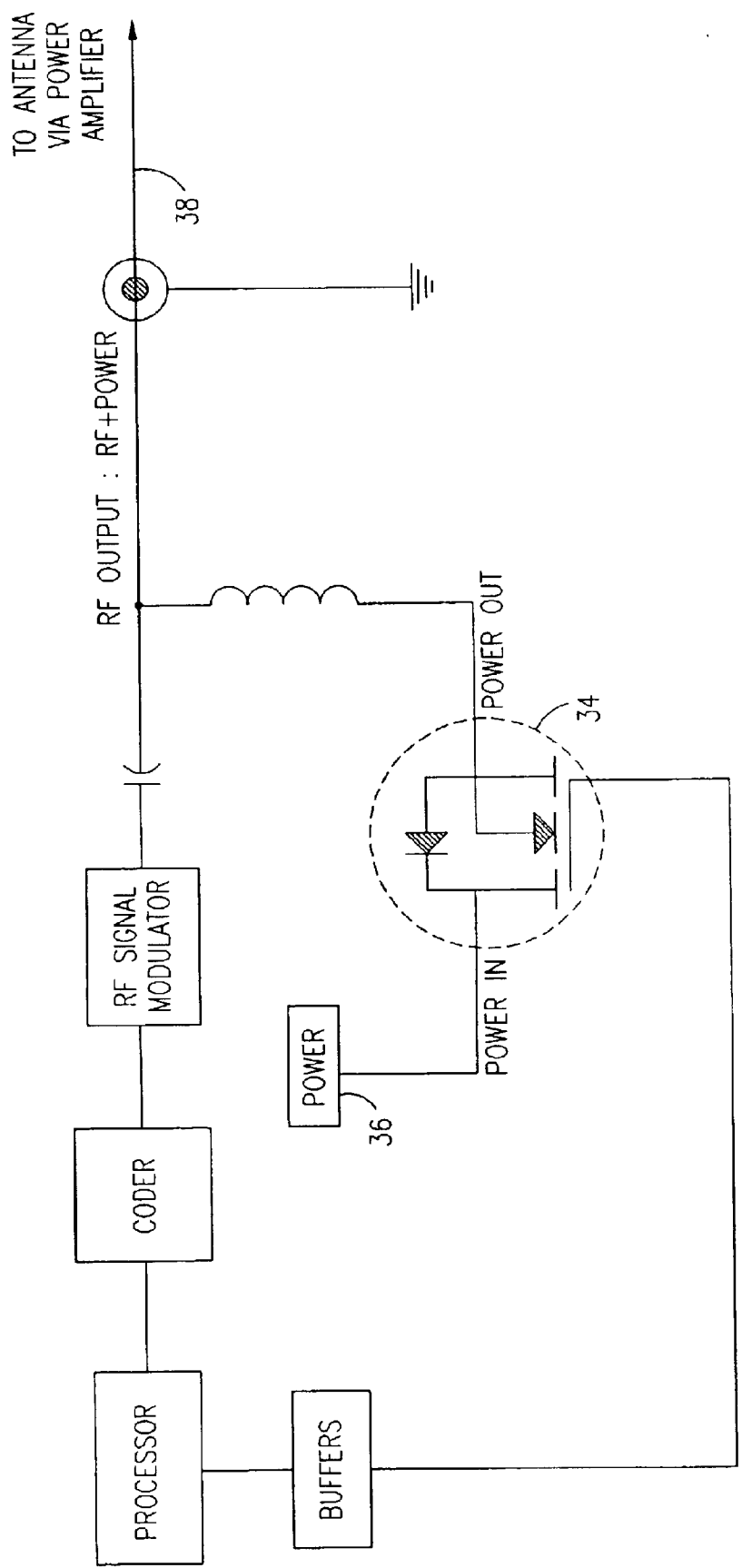
FIG. 4 is a simplified block diagram of electronic elements of controller 14 of FIG. 2.

Reference is now made to FIG. 4 which is a simplified block diagram of transmission and power control elements typically included in controller 14 of FIG. 2. In addition to transmission circuitry well known for VSAT control units, a power control switch 34 is provided, typically coupled to a power source 36 which may be an AC or DC power source. In this manner power may be provided together with an RF transmission via an output 38 to the antenna transmitter and power amplifier (not shown), or cut off when there is no RF transmission to be sent.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

What is claimed is:

1. A VSAT terminal comprising:
   an antenna;
   a microwave power amplifier;
   a microwave low noise amplifier;
   a transmitter coupled via said microwave power amplifier to said antenna;
   a user VSAT interface; and
   a controller in communication with said user VSAT interface and in electrical connection with said microwave power amplifier and said microwave low noise amplifier for supplying power thereto, said controller being operative to provide a less-than-full electrical power supply to said microwave low noise amplifier and operative to provide a full electrical power supply to said microwave low noise amplifier in the presence of a communication session, wherein said communication session is initiated by the reception of data or user initiated transmission of data, said controller being operative to maintain the less-than-full electrical power supply to said microwave low noise amplifier until the presence of the communication session, and wherein said controller does not return said microwave low noise amplifier to full electrical power between communication sessions.

2. A VSAT terminal according to claim 1 wherein said controller is responsive to operation of said user VSAT interface for providing electrical power to said microwave power amplifier.

3. A VSAT terminal according to claim 1 wherein said controller is responsive to operation of said user VSAT interface for providing electrical power to said microwave low noise amplifier.

4. A VSAT terminal according to claim 1 wherein said controller provides a less-than-full power supply to said microwave low noise amplifier and said microwave power amplifier in the absence of a communication session and wherein said controller is responsive to operation of said user VSAT interface for providing a full electrical power supply to said microwave low noise amplifier and said microwave power amplifier.

5. A VSAT terminal according to claim 1 and wherein said controller is operative to provide a less-than-full electrical power supply to said one of said amplifiers after a predetermined period of inactivity of said microwave low noise amplifier.

6. A VSAT terminal according to claim 1 and wherein said controller operates in accordance with a predetermined algorithm for providing electrical power to said microwave power amplifier.

7. A VSAT telecommunication network comprising: at least one satellite; and
   a plurality of VSAT terminals in communication with said satellite, wherein at least one of said VSAT terminals comprises:
   an antenna;
   a microwave power amplifier;
   a microwave low noise amplifier;
   a transmitter coupled via said microwave power amplifier to said antenna;
   a receiver coupled via said microwave low noise amplifier to said antenna;
   a user VSAT interface; and
   a controller in communication with said user VSAT interface and in electrical connection with said microwave power amplifier and said microwave low noise amplifier for supplying power thereto, said controller being operative to provide a full electrical power supply to said microwave low noise amplifier in the presence of a communication session, wherein said communication session is initiated by the reception of data or user initiated transmission of data, said controller being operative to maintain the less-than-full electrical power supply to said microwave low noise amplifier until the presence of the communication session, and wherein said controller does not return said microwave low noise amplifier to full electrical power between communication sessions.

8. A method for managing power consumption in a VSAT terminal having an antenna, a microwave power amplifier, a microwave low noise amplifier, a transmitter coupled via said microwave power amplifier to said antenna, a receiver coupled via said microwave low noise amplifier to said antenna, a user VSAT interface, and a controller in communication with said user VSAT interface, said microwave low noise amplifier, and said microwave power amplifier, the method comprising:
   providing a less-than-full electrical power supply to said microwave low noise amplifier after a predetermined period of inactivity of said user VSAT interface; and
   providing a full electrical power supply to said microwave low noise amplifier in the presence of a communication session, said communication session being initiated by the reception of data or user initiated transmission of data, wherein
   said providing of the less-than-full electrical power supply to said microwave low noise amplifier comprises maintaining said less-than-full electrical power supply to said low noise amplifier until the presence of the communication session,
   wherein said controller does not return said microwave low noise amplifier to full electrical power between communication sessions.

9. A method according to claim 8 wherein said providing a less-than-full electrical power supply step comprises providing a less-than-full power supply to said microwave low noise amplifier and said microwave power amplifier in the absence of a communication session and wherein said providing a full electrical power supply step comprises providing a full electrical power supply to said microwave low noise amplifier and said microwave power amplifier in response to operation of said user VSAT interface.

10. A method according to claim 8 and wherein said providing a less-than-full electrical power supply step comprises providing a less-than-full power supply to said one of said amplifiers after the predetermined period of inactivity of said microwave low noise amplifier.

11. A VSAT terminal comprising:
    an antenna:
    a microwave power amplifier;
    a microwave low noise amplifier;
    a transmitter coupled via said microwave power amplifier to said antenna;
    a receiver coupled via said microwave low noise amplifier to said antenna;
    a user VSAT interface; and
    a controller in communication with said user VSAT interface and in electrical connection with said microwave power amplifier and said microwave low noise amplifier for supplying power thereto, said controller being operative to provide a less-than-full electrical power supply to said microwave low noise amplifier after a predetermined period of inactivity of said microwave low noise amplifier and operative to provide a full electrical power supply to said microwave low noise amplifier in the presence of a communication session, wherein said communication session is initiated by the reception of data or user initiated transmission of data, said controller being operative to maintain the less-than-full electrical power supply to said one of said amplifiers until the presence of the communication session, and wherein said controller does not return said microwave low noise amplifier to full electrical power between communication sessions.

12. A VSAT telecommunication network comprising:

at least one satellite; and a plurality of VSAT terminals in communication with said satellite, wherein at least one of said VSAT terminals comprises:

an antenna;

a microwave power amplifier;

a microwave low noise amplifier;

a transmitter coupled via said microwave power amplifier to said antenna;

a receiver coupled via said microwave low noise amplifier to said antenna;

a user VSAT interface; and a controller in communication with said user VSAT interface and in electrical connection with said microwave power amplifier and said microwave low noise amplifier support for supplying power thereto, said controller being operative to provide a less-than-full electrical power supply to said microwave low noise amplifier after a predetermined period of inactivity of said microwave low noise amplifier and operative to provide a full electrical power supply to said microwave low noise amplifier in the presence of a communication session, wherein said communication session is initiated by the reception of data or user initiated transmission of data, said controller being operative to maintain the less-than-full electrical power supply to said microwave low noise amplifier until the presence of the communication session, and wherein said controller does not return said microwave low noise amplifier to full electrical power between communication sessions.

13. A method for managing power consumption in a VSAT terminal having an antenna, a microwave power amplifier, a microwave low noise amplifier, a transmitter coupled via said microwave power amplifier to said antenna, a receiver coupled via said microwave low noise amplifier to said antenna, a user VSAT interface, and a controller in communication with said user VSAT interface, said microwave low noise amplifier, and said microwave power amplifier, the method comprising:

providing a less-than-full electrical power supply to said microwave low noise amplifier after a predetermined period of inactivity of said microwave low noise amplifier; and providing a full electrical power supply to said microwave low noise amplifier in the presence of the communication session, wherein said providing of the less-than-full electrical power supply to said microwave low noise amplifier comprises maintaining said less-than-full electrical power supply to said microwave low noise amplifier until the presence of a communication session, wherein said communication session is initiated by the reception of data or user initiated transmission of data, wherein said controller does not return said microwave low noise amplifier to full electrical power between communication sessions.

14. A VSAT terminal comprising:

an antenna;

an ODU transmitter coupled to said antenna;

a microwave low noise amplifier;

a user VSAT interface; and a controller in communication with said user VSAT interface and in electrical connection with said ODU transmitter and said microwave low noise amplifier for supplying power thereto, said controller being a operative to provide no power supply to one of said microwave low noise amplifier and said ODU transmitter after a predetermined period of inactivity of said user VSAT interface and operative to provide a full electrical power supply to said one of microwave low noise amplifier and said ODU transmitter in the presence of a communication session, wherein said communication session is initiated by the reception of data or user initiated transmission of data, said controller being operative to maintain no power to said one of said microwave low noise amplifier and said ODU transmitter until the presence of the communication session, and wherein said controller does not return said one of said microwave low noise amplifier and said ODU transmitter to full electrical power between communication sessions.

15. A method for managing power consumption in a VSAT terminal having an antenna, an ODU transmitter coupled to said antenna, a microwave low noise amplifier, a receiver coupled to said microwave low noise amplifier to said antenna, a user VSAT interface, and a controller in communication with said user VSAT interface, said microwave low noise amplifier, and said ODU transmitter, the method comprising:

providing no electrical power to one of said ODU transmitter and said microwave low noise amplifier after a predetermined period of inactivity of said user VSAT interface; and providing a full of electrical power to said one of said ODU transmitter and said microwave low noise amplifier in the presence of a communication session, wherein said communication session is initiated by the reception of data or by user initiated transmission of data, wherein said providing of the no electrical power to said one of said ODU transmitter and said microwave low noise amplifier comprises maintaining said no electrical power to said one of said ODU transmitter and said microwave low noise amplifier until the presence of the communication session, wherein said controller does not return said one of said ODU transmitter and said microwave low noise amplifier to full electrical power between communication sessions.

* * * * *